(12) United States Patent
Ishizaki et al.

(10) Patent No.: US 8,580,381 B2
(45) Date of Patent: Nov. 12, 2013

(54) OXYGEN ABSORBER FOR BLENDING IN A RESIN AND METHOD OF PRODUCING THE SAME

(75) Inventors: Youichi Ishizaki, Yokohama (JP); Keiji Fukue, Yokohama (JP); Kazuhiro Seno, Okayama (JP)

(73) Assignees: Toyo Seikan Kaisha, Ltd, Tokyo (JP); Dowa Electronics Materials Co., Ltd, Tokyo (JP); Dowa IP Creation Co., Ltd, Okayama (JP)

( * ) Notice: Subject to any disclaimer, the term of this patent is extended or adjusted under 35 U.S.C. 154(b) by 773 days.

(21) Appl. No.: 12/297,790

(22) PCT Filed: Apr. 20, 2007

(86) PCT No.: PCT/JP2007/059137
§ 371 (c)(1),
(2), (4) Date: Oct. 20, 2008

(87) PCT Pub. No.: WO2007/123272
PCT Pub. Date: Nov. 1, 2007

(65) Prior Publication Data
US 2009/0110857 A1 Apr. 30, 2009

(30) Foreign Application Priority Data
Apr. 20, 2006 (JP) ................................. 2006-116374

(51) Int. Cl.
*B32B 9/00* (2006.01)
*B01J 20/00* (2006.01)

(52) U.S. Cl.
USPC ......................................... 428/402; 502/400

(58) Field of Classification Search
None
See application file for complete search history.

(56) References Cited

FOREIGN PATENT DOCUMENTS

| JP | 05-116213 A | 5/1993 |
|---|---|---|
| JP | 10-017901 A | 1/1998 |
| JP | 11-060762 A | 3/1999 |
| JP | 2000-109706 A | 5/2000 |
| JP | 2000-248111 A | 9/2000 |
| JP | 2000-279147 A | 10/2000 |
| JP | 2002-193233 A | 7/2002 |

OTHER PUBLICATIONS

Machine translation of JP 2000-24811.*
Machine translation of JP 11-060762.*
Machine translation of 2000-279147.*

* cited by examiner

*Primary Examiner* — Mark Ruthkosky
*Assistant Examiner* — Alexandre Ferre
(74) *Attorney, Agent, or Firm* — Sughrue Mion, PLLC

(57) ABSTRACT

An oxygen absorber for blending in a resin, comprising a mixed powder containing an iron powder, a metal halide and an alkaline substance, and having a half-peak width on a plane (110) of 0.20°/2θ (Co—Kα) or less as measured by a powder X-ray diffraction method, a specific surface area of 0.5 m²/g or more, and an average particle size of 1 to 40 μm. The oxygen absorber effectively suppresses the generation of hydrogen, features excellent safety, exhibits excellent oxygen-absorbing capability and offers an advantage of high productivity due to the suppressed occurrence of coarse particles in the step of producing the oxygen absorber.

5 Claims, 1 Drawing Sheet

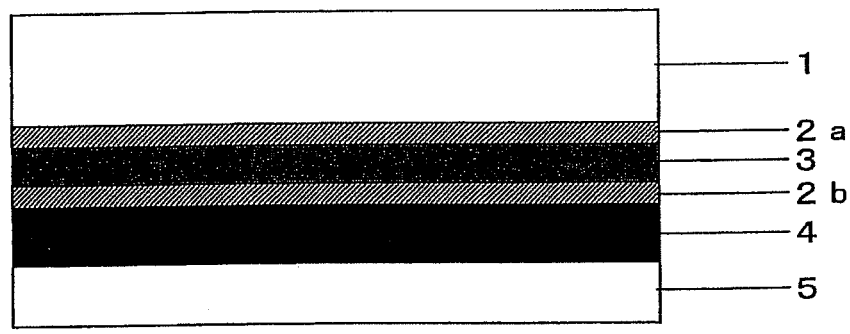

OXYGEN ABSORBER FOR BLENDING IN A RESIN AND METHOD OF PRODUCING THE SAME

TECHNICAL FIELD

The present invention relates to an oxygen absorber for blending in a resin and to a method of producing the same. More specifically, the invention relates to an oxygen absorber for blending in a resin effectively suppressing the generation of hydrogen that accompanies the reaction for absorbing oxygen, featuring excellent oxygen absorption, safety and appearance, and to a method of producing the same.

BACKGROUND ART

Metal cans, glass bottles and various plastic containers have heretofore been used as packing containers. Among them, plastic containers have been used for a variety of applications from the standpoint of their small weight, shock resistance and cost.

However, though the metal cans and glass bottles permit no oxygen to pass through the container walls, the plastic containers permit oxygen to pass through the container walls to an extent that is not negligible causing a problem from the standpoint of preserving the content.

To enhance the preservation property of the contents, there have been used packing containers using a gas-barrier resin preventing the permeation of oxygen from the exterior in combination with an oxygen-absorbing material that traps oxygen remaining in the container.

Presence of water is essential for the oxygen-absorbing reaction of an iron-type oxygen absorber that is usually used as an oxygen-absorbing material, and iron reacts with water to generate hydrogen. Here, hydrogen that is generated may cause the packing material to become rugged, swollen or ruptured.

Various prior technologies have been proposed to suppress the generation of hydrogen from the oxygen absorber. JP-A-2000-248111 proposes a technology for adding an alkaline substance which is sparingly soluble in water to an oxygen absorber, and JP-A-2000-279147 proposes a method of heat-treating the oxygen absorber.

DISCLOSURE OF THE INVENTION

With the oxygen absorbers disclosed in the above patent documents 1 and 2, however, it is difficult to suppress the generation of hydrogen to a sufficient degree. Besides, there remains a problem in that the oxygen-absorbing capability decreases if the treatment is conducted to an excess degree to sufficiently suppress the generation of hydrogen. Further, the method disclosed in the patent document 2 involves a problem in that the oxygen absorber is sintered during the heat treatment forming coarse particles in large amounts. When the method is applied to the films and the thin containers in particular, the coarse particles become a cause of deteriorating the appearance and must, therefore, be removed by the classification operation. When formed in large amounts, therefore, the coarse particles lower the yield and deteriorate the productivity.

It is, therefore, an object of the present invention to provide an oxygen absorber for blending in a resin, which effectively suppresses the generation of hydrogen, exhibits excellent oxygen-absorbing capability and appearance, and can be highly efficiently produced.

Another object of the present invention is to provide a method of producing the above oxygen absorber for blending in a resin, and an oxygen-absorbing container made from an oxygen-absorbing resin composition containing the oxygen absorber for blending in a resin, featuring excellent preservation of the content and exhibiting excellent appearance.

According to the present invention, there is provided an oxygen absorber for blending in a resin, comprising a mixed powder containing an iron powder, a metal halide and an alkaline substance, and having a half-peak width on a plane (110) of $0.20°/2\theta$ (Co—K$\alpha$) or less as measured by a powder X-ray diffraction method, a specific surface area of $0.5 \text{ m}^2/\text{g}$ or more, and an average particle size of 1 to 40 µm.

In the oxygen absorber for blending in a resin of the present invention, it is desired that:

1. The surfaces of the iron powder are coated with an iron oxide, and the content of metal iron in the iron powder is 60 to 85% by weight;
2. The amount of metal iron in the iron powder decreases due to the heat treatment in the presence of oxygen;
3. The alkaline substance is a calcium hydroxide or a calcium oxide; and
4. The alkaline substance is contained in an amount of 0.5 to 2 parts by weight per 100 parts by weight of the iron powder.

According to the present invention, there is further provided an oxygen-absorbing resin composition containing the above oxygen absorber for blending in a resin.

According to the present invention, there is further provided an oxygen-absorbing container containing the above oxygen-absorbing resin composition.

The invention further provides a method of producing an oxygen absorber for blending in a resin by mixing and pulverizing an iron powder, a metal halide and an alkaline substance, followed by the heat treatment in the presence of oxygen.

The oxygen absorber for blending in a resin of the invention effectively suppresses the generation of hydrogen, features a high degree safety, excellent oxygen-absorbing capability, and suppresses the formation of coarse particles in the steps of producing the oxygen absorber.

Further, the oxygen-absorbing container of the invention has a layer comprising an oxygen-absorbing resin composition which contains the oxygen absorber for blending in a resin, and excellently preserves the content, offers excellent appearance with little ruggedness on the surface, and is free from such occurrences as swelling or rupture of the container that stem from the generation of hydrogen.

As described above, oxygen absorbers that are so treated as to suppress the generation of hydrogen have heretofore been known comprising mixed powders containing an iron powder, a metal halide and an alkaline substance. However, the present inventors have discovered that distinguished advantages can be obtained in both the effect for suppressing the generation of hydrogen and the oxygen-absorbing capability as compared to the conventional oxygen absorbers if an oxygen absorber of the above composition is so treated as to possess a half-peak width on a plane (110) of $0.20 °/2\theta$ (Co—K$\alpha$) or less as measured by a powder X-ray diffraction method, a specific surface area of $0.5 \text{ m}^2/\text{g}$ or more, and an average particle size of 1 to 40 µm.

The peak on the plane (110) as measured by the powder X-ray diffraction method of the present invention represents a peak of crystals of the iron powder. A large half-peak width on the plane (110) means a large crystal distortion of the iron powder. The oxygen absorber of the present invention has a half-peak width on a plane (110) of 0.20°/2θ (Co—Kα) or less, from which it will be understood that the iron powder has a small crystal distortion.

The present inventors have discovered the fact that the crystal distortion of the iron powder affects the generation of hydrogen gas in the oxygen-absorbing reaction. Namely, as will become obvious from the results of Examples appearing later, an oxygen absorber (Comparative Example 5) same as that of Example 1 except that the half-peak width thereof on the plane (110) is not smaller than 0.20°/2θ (Co—Kα) permits hydrogen to generate in large amounts and fails to sufficiently suppress the generation of hydrogen. It will therefore be learned that the half-peak width on the plane (110) of 0.20θ/2θ (Co—Kα) or less has a critical meaning in the effect for suppressing the generation of hydrogen.

In the oxygen absorber for blending in a resin of the present invention, further, it is important that the specific surface area (BET specific surface area) is 0.5 $m^2/g$ or more and, particularly, 1.0 $m^2/g$ or more from the standpoint of oxygen-absorbing capability. The specific surface area of the oxygen absorber is closely related to its oxygen-absorbing capability. The oxygen absorber having a specific surface area of smaller than 0.5 $m^2/g$ is not capable of exhibiting a sufficiently large oxygen-absorbing rate. Therefore, the container using this oxygen absorber becomes inferior in preserving the content. It is, further, important that the average particle size (median diameter) is in a range of 1 to 40 μm and, particularly, 5 to 30 μm from the standpoint of maintaining favorable appearance of the films and containers for which the oxygen absorber is used. If the average particle size is 40 μm or larger, the surfaces of the films and containers become rugged particularly when the thickness is small often spoiling the appearance or causing the sealing to become defective and, further, often making it difficult to attain oxygen-absorbing capability to a sufficient degree. If the average particle size is 1 μm or smaller, heat is generated spontaneously due to the formation of powder during the work or due to oxidation and, besides, there arouses a probability of dust explosion making it extremely difficult to handle with.

The oxygen absorber for blending in a resin of the present invention comprises a mixed powder of an iron powder, a metal halide and an alkaline substance, which, as will be described later, have been treated with heat in the presence of oxygen. Therefore, the surfaces of the iron powder have been coated with iron oxide, and the iron powder contains metal iron in a decreased amount. In the present invention, in particular, it is desired that the content of metal iron in the iron powder is 60 to 85% by weight. With the surfaces of the iron powder being coated with iron oxide, it is considered that the reaction for generating a hydrogen gas is inactivated and the amount of the hydrogen gas that is generated is suppressed. It is therefore probable that the oxygen-absorbing capability drops due to the oxidation of the surfaces of the iron powder. Upon so controlling the degree of oxidation that the content of metal iron in the iron powder is 60 to 85% by weight, however, it is made possible to suppress a decrease in the oxygen-absorbing capability and, therefore, to maintain a high oxygen-absorbing capability.

BRIEF DESCRIPTION OF THE DRAWINGS

FIG. 1 is a view illustrating the sectional structure of an oxygen-absorbing container according to the present invention.

BEST MODE FOR CARRYING OUT THE INVENTION (Starting Materials)

As the iron powder that can be used for the oxygen absorber of the invention, there can be exemplified known iron powders such as a reduced iron powder, an atomized iron powder, an electrolyzed iron powder and a carbonyl iron powder. Among them, it is desired to use the reduced iron powder which is porous and has a relatively large specific surface area and, particularly, a rotary reduced iron powder. The rotary reduced iron powder has a high purity and a large specific surface area, and exhibits excellent oxygen-absorbing capability.

As the metal halide used for the oxygen absorber of the present invention, there can be exemplified an alkali metal, alkaline earth metals or any other halides such as of copper, zinc, iron or the like. Concretely, there can be exemplified sodium chloride, sodium bromide, sodium iodide, potassium chloride, potassium bromide, potassium iodide, calcium chloride, magnesium chloride and barium chloride. In the present invention, however, sodium chloride is particularly preferred.

It is desired that the metal halide is blended in an amount of 0.1 to 10 parts by weight and, particularly, 1 to 5 parts by weight per 100 parts by weight of the iron powder which is a chief component of the oxygen absorber. If the amount of the metal halide is smaller than the above range, it becomes difficult to obtain an expected oxygen-absorbing capability. If the amount of the metal halide is larger than the above range, on the other hand, it is probable that the oxygen-absorbing capability decreases due to a decrease in the blending ratio of the iron powder in the oxygen absorber. Besides, the metal halide may ooze out from the packing material which comprises a resin composition blended with the oxygen absorber, adversely affecting the appearance and the content.

As the alkaline substance used for the present invention, there can be exemplified magnesium hydroxide, calcium hydroxide, strontium hydroxide, barium hydroxide, magnesium carbonate, calcium carbonate, strontium carbonate and barium carbonate. In the present invention, however, it is particularly desired to use calcium hydroxide or calcium oxide which is a dehydrate of calcium hydroxide.

It is desired that the alkaline substance is blended in an amount of 0.5 to 2 parts by weight and, particularly, 1 to 2 parts by weight per 100 parts by weight of the iron powder. If the amount of the alkaline substance is smaller than the above range, the effect for suppressing the generation of hydrogen becomes inferior to that of when the amount thereof lies in the above range. If the amount of the alkaline substance is larger than the above range, on the other hand, the oxygen-absorbing capability becomes inferior to that of when the amount thereof lies in the above range.

(Production Method)

The oxygen absorber for blending in a resin of the invention is produced in a manner as described below.

As required, the rotary reduced iron powder is roughly pulverized so as to possess an average particle size of 40 to 100 μm. Thereafter, to the iron powder, predetermined amounts of a metal halide and an alkaline substance are added and mixed together, and the mixture is finely pulverized so as to possess an average particle size of 1 to 40 μm. In this case, crystal distortion occurs in the iron powder due to the mechanical mixing and pulverization. In the present invention, however, the crystal distortion is relaxed by the heat treatment that will be described later.

The mixing and pulverization are executed by employing known means such as a vibration mill, a ball mill, a tube mill or a super mixer. Instead of simultaneously executing the pulverization and mixing, it is also allowable to employ a method of coating by spraying a solution containing a metal halide and an alkaline substance onto the surfaces of the iron powder which has been adjusted to possess a suitable particle size.

Next, the finely pulverized material is so classified as to remove coarse particles having particle sizes of 90 μm or more. The classifying operation is conducted by sieving, pneumatic classification or the like. The heat treatment is for relaxing the crystal distortion caused by the mixing and pulverization mentioned above and for forming iron oxide on the surfaces of the iron powder. Here, however, it is desired the content of metal iron in the iron powder is 60 to 85% by weight. For this purpose, it is desired to conduct the heat treatment in the presence of oxygen (air) in combination with the heat treatment in an inert gas atmosphere, preferably, in a nitrogen atmosphere.

Concretely speaking, it is desired to conduct the heat treatment in the presence of oxygen and, then to conduct the heat treatment in the nitrogen atmosphere before or after the above step. A preferred temperature of the heat treatment in the oxygen atmosphere is 400 to 600° C. and, more desirably, 500 to 550° C., and a preferred time of the heat treatment is 2 to 12 hours and, more desirably, 4 to 10 hours. A preferred temperature of the heat treatment in the nitrogen atmosphere is 400 to 600° C. and, more desirably, 500 to 550° C., and a preferred time of the heat treatment is 0 to 6 hours and, more desirably, 0 to 2 hours.

This makes it possible to sufficiently relax the crystal distortion of the iron powder caused by the mixing and pulverization and to render the content of the metal iron in the iron power to lie in the above range while forming iron oxide on the surfaces of the iron powder, suppressing the generation of the hydrogen gas without impairing the oxygen-absorbing capability possessed by the iron powder.

In the heat treatment, the alkaline substance that is present in the finely pulverized material suppresses the formation of coarse particles that stem from the sintering of the finely pulverized material. Coarse particles having particle sizes of more than 90 μm are removed by the classification after the heat treatment. Here, as will be learned from the results of Examples appearing later, the amounts of coarse particles removed by the classification in Examples 1 and 2 in which calcium hydroxide is contained in the finely pulverized material, are smaller than those of Comparative Examples 2 and 3 in which no alkaline substance is contained in the finely pulverized material. That is, the heat treatment in the presence of the alkaline substance improves the yield and productivity.

(Oxygen-Absorbing Resin Composition)

The oxygen-absorbing resin composition of the present invention is obtained by blending the resin with the above-mentioned oxygen absorber for blending in a resin and mixing them together. The mixing may be either melt-blending or dry-blending. When the oxygen absorber is to be blended in a small amount, it is desired to prepare a master batch that contains the oxygen absorber at a high concentration and mix the master batch into the resin.

As the resin in which the oxygen absorber of the present invention can be blended, though there is no limitation, there can be exemplified thermoplastic resins that have heretofore been used for the packing materials. Concrete examples include olefin resins such as low-, medium- or high-density polyethylene, polypropylene, ethylene/propylene copolymer, polybutene-1, ethylene/butene-1 copolymer, propylene/butene-1 copolymer, ethylene/propylene/butene-1 copolymer, polymethylpentene-1, ethylene/vinyl acetate copolymer, ethylene/(meth)acrylic acid copolymer, ionically crosslinked olefin copolymer (ionomer), ethylene/vinyl alcohol copolymer or a blend thereof; styrene resins such as polystyrene, styrene/butadiene copolymer, styrene/isoprene copolymer, and ABS resin; polyesters such as polyethylene terephthalate, polyethylene naphthalate, polytetramethylene terephthalate, glycol-modified polyethylene terephthalate, polylactic acid and polybutylene succinate; amides such as nylon 6, nylon 66; and polycarbonate.

It is desired that the oxygen absorber of the invention is blended in the resin in an amount of 1 to 100 parts by weight and, particularly, 5 to 70 parts by weight per 100 parts by weight of the resin. If the oxygen absorber is blended in an amount smaller than the above range, it is not allowed to obtain an expected oxygen-absorbing capability. If the blended amount thereof is larger than the above range, on the other hand, the molded article and the packing material may exhibit deteriorated properties.

(Oxygen-Absorbing Containers)

It is desired that the oxygen-absorbing container of the invention has a multi-layer structure including a layer of an oxygen-absorbing resin composition blended with the above oxygen absorber and, particularly, is a multi-layer container in which the layer comprising the oxygen-absorbing resin composition becomes an intermediate layer.

FIG. 1 is a view illustrating the sectional structure of an oxygen-absorbing container according to the present invention comprising, in order from the side of the outer layer, an outer polypropylene layer 1 containing titanium dioxide, an adhesive resin layer 2a, a gas-barrier resin layer 3, an adhesive resin layer 2b an oxygen-absorbing resin layer 4, and an inner polypropylene layer 5 containing titanium dioxide. In this concrete example, titanium dioxide is contained in the outer layer 1 and in the inner layer 5, concealing the color due to the iron powder in the oxygen-absorbing resin layer 4 and, besides, the gas-barrier layer 3 is formed on the side of the outer layer. Therefore, permeation of oxygen from the outer side is effectively prevented, and the content can be excellently preserved being compounded by the presence of the oxygen-absorbing resin layer.

As the resin that constitutes the inner and outer layers, though there is no limitation, there can be exemplified thermoplastic resins that have heretofore been used for the packing materials. Concrete examples include olefin resins such as low-, medium- or high-density polyethylene, polypropylene, ethylene/propylene copolymer, polybutene-1, ethylene/butene-1 copolymer, propylene/butene-1 copolymer, ethylene/propylene/butene-1 copolymer, polymethylpentene-1, ethylene/vinyl acetate copolymer, ethylene/(meth) acrylic acid copolymer, ionically crosslinked olefin copolymer (ionomer) or a blend thereof; styrene resins such as polystyrene, styrene/butadiene copolymer, styrene/isoprene copolymer, and ABS resin; polyesters such as polyethylene terephthalate, polyethylene naphthalate, polytetramethylene terephthalate, glycol-modified polyethylene terephthalate, polylactic acid and polybutylene succinate; amides such as nylon 6, nylon 66; and polycarbonate.

In laminating the layers, there can be used an adhesive resin which, though there is no limitation, may be ethylene/acrylic acid copolymer, ionically crosslinked olefin copolymer, maleic anhydride-grafted polyethylene, maleic anhydride-grafted polypropylene, acrylic acid-grafted polyolefin, ethylene/vinyl acetate copolymer, copolymerized polyester or a copolymerized polyamide, which can be used in one kind or in two or more kinds in combination.

As the resin that constitutes the gas-barrier layer, there can be used such a gas-barrier resin as ethylene/vinyl alcohol copolymer, nylon MXD6, or polyglycolic acid. In the case of the film container in particular, there can be, further, preferably used an aluminum foil or a metal foil such as of a steel, an inorganic thin deposited film, or a gas-barrier coated film obtained by applying a base film with a gas-barrier material of the type of polyvinyl alcohol or polyacrylic acid.

In the multi-layer container, it is desired that the layer comprising the oxygen-absorbing resin composition of the invention is, usually, in a range of 5 to 300 μm and, particularly, 10 to 100 μm while the inner and outer layers are, usually, in a range of 5 to 1000 μm and, particularly, 10 to 500 μm.

The oxygen-absorbing container of the invention can be produced by a known method but having a layer comprising the oxygen-absorbing resin composition of the invention.

In simultaneously extruding a multiplicity of layers, the resins are melted and kneaded by the extruders corresponding to the respective resin layers, and are extruded into predetermined shapes through a multi-layer multiplexing die such as a T-die or a circular die. After melt-kneaded through the injectors corresponding to the respective resin layers, the resins are co-injected or successively injected into an injection metal mold to prepare a multi-layer container or a preform for producing a container. There can be further employed such a lamination system as dry lamination, sandwich lamination or extrusion coating.

The formed article can assume the form of a film, a sheet, a parison or a pipe for forming bottles or tubes, or a preform for forming bottles or tubes. The bottle can be easily formed from the parison, pipe or preform by pinching off the extruded article in a pair of split molds and blowing the fluid into the interior thereof. Further, the pipe or the preform is cooled and is, thereafter, heated at a drawing temperature so as to be drawn in the axial direction followed by blow-drawing in the circumferential direction by the fluid pressure to obtain a draw-blown bottle. Further, the film or sheet is subjected to such means as vacuum forming, compressed air forming, bulge forming or plug-assisted forming to obtain a packing container of the shape of a cup or a tray.

Further, the multi-layer film can be formed into a bag-like container by overlapping or folding it like a bag and heat-sealing the peripheries thereof.

EXAMPLES

The invention will be described below more concretely by way of Examples and Comparative Examples in which the oxygen-absorbing capabilities and the amounts of hydrogen generation were evaluated as described below.

<Evaluation of the Oxygen-Absorbing Capabilities and the Amounts of Hydrogen Generation in Examples 1, 2 and Comparative Examples 1 to 6>

Into a gas-impermeable plastic container of a content of about 85 ml laminated with a steel foil, about 0.03 g of an oxygen absorber and about 1.0 ml of distilled water were fed so will not to come in contact with each other and were heat-sealed in the air by using a heat-sealing lid made of a gas-impermeable aluminum foil-laminated film. After preserved at 22° C. for one hour, the gas composition in the container was analyzed by using a gas chromatography (GC-3BT, manufactured by Shimazu Seisakusho Co.). From the obtained results, the amount of oxygen absorption was calculated per a unit weight of the oxygen absorber.

To evaluate the amount of hydrogen generation, the oxygen absorber was fed in an amount of 0.3 g into the container, and the amount of hydrogen generation per the unit weight of the oxygen absorber was calculated from the analyzed results of gas composition in the container after preserved at 22° C. for 15 days.

<Evaluation of the Oxygen-Absorbing Capabilities and the Amounts of Hydrogen Generation in Example 3 and Comparative Example 7>

Into a gas-impermeable plastic container of a content of about 85 ml laminated with a steel foil, 16 cm² of an oxygen-absorbing sheet and about 1.0 ml of distilled water were fed so will not to come in contact with each other and were heat-sealed in the air by using a heat-sealing lid made of a gas-impermeable aluminum foil-laminated film. After preserved at 22° C. for 30 days, the gas composition in the container was analyzed by using the gas chromatography. From the obtained results, the amount of oxygen absorption was calculated per a unit area of the oxygen-absorbing sheet.

To evaluate the amount of hydrogen generation, the container was heat-sealed in a nitrogen atmosphere so that the initial oxygen concentration in the container was 1% or less, and the amount of hydrogen generation per the unit area of the oxygen-absorbing sheet was calculated from the analyzed results of gas composition in the container after preserved at 22° C. for 30 days.

Example 1

100 Parts by weight of a rotary reduced iron powder (metal iron content of 90%, average particle size of 45 μm), 2 parts by weight of table salt and 1 part by weight of calcium hydroxide were mixed together, were pulverized for 10 hours by using a vibration ball mill, and were classified by using a sieve of 180 mesh to remove coarse particles of 90 μm or larger to thereby obtain a mixed and finely pulverized material. The obtained finely pulverized material was charged in an amount of 50 kg in a batch-type rotary furnace of a volume of 230 l, and was heat-treated under the conditions of a rotational speed of 6 rpm, nitrogen gas flow rate of 10 l/min., and 550° C. for 8 hours (heated for 2 hours, cooled for 8 hours). During the heat treatment, the air was introduced instead of the nitrogen gas at a flow rate of 10 l/min. for 6 hours to accelerate the oxidation on the surfaces. The obtained heat-treated oxygen absorber was classified by using a sieve of 180 mesh to remove coarse particles of 90 μm or larger to thereby obtain an oxygen absorber. The oxygen absorber possessed a specific surface area of 1.8 m²/g, an average particle size (median diameter) of 23 μm, a half-peak width on a plane (110) of iron of 0.12°/2θ as measured by the X-ray diffraction, and the content of metal iron of 80%. Table 1 shows the amount of coarse particles contained in the obtained oxygen absorber and removed by the classification of two times in the step of production together with the measured results of the amount of oxygen absorption and the amount of hydrogen generation.

The columns "Comparative" in Table 1 show the amount of oxygen absorption and the amount of hydrogen generation in percentages with the oxygen absorber of Comparative Example 1 appearing later as a reference. Products having relative values of the amounts of oxygen absorption of 80% or more or having relative values of the amounts of hydrogen generation of 1% or less, are evaluated to be the acceptable products. Further, the products containing coarse particles in amounts of 20% or less were evaluated to be acceptable products.

Example 2

An oxygen absorber was obtained in the same manner as in Example 1 but adding the calcium hydroxide in an amount of 2 parts by weight and charging the mixed and finely pulverized material in an amount of 25 kg in the batch-type rotary furnace. The oxygen absorber possessed a specific surface area of 1.0 m²/g, an average particle size of 23 μm, a half-peak width on a plane (110) of iron of 0.13°/2θ as measured by the X-ray diffraction, and the content of metal iron of 67%. Table 1 shows the amount of coarse particles contained in the obtained oxygen absorber and removed by the classification of two times in the step of production together with the measured results of the amount of oxygen absorption and the amount of hydrogen generation.

Comparative Example 1

An oxygen absorber was obtained in the same manner as in Example 1 but without adding the calcium hydroxide and effecting neither the heat treatment nor the classification after the heat treatment. The oxygen absorber possessed a specific surface area of 2.4 m²/g, an average particle size of 23 μm, a half-peak width on a plane (110) of iron of 0.29°/2θ as measured by the X-ray diffraction, and the content of metal iron of 88%. Table 1 shows the amount of coarse particles contained in the obtained oxygen absorber and removed by the classification together with the measured results of the amount of oxygen absorption and the amount of hydrogen generation.

Comparative Example 2

An oxygen absorber was obtained in the same manner as in Example 2 but without adding the calcium hydroxide. The oxygen absorber possessed a specific surface area of 1.8 m²/g, an average particle size of 24 μm, a half-peak width on a plane (110) of iron of 0.12°/2θ as measured by the X-ray diffraction, and the content of metal iron of 67%. Table 1 shows the amount of coarse particles contained in the obtained oxygen absorber and removed by the classification of two times in the step of production together with the measured results of the amount of oxygen absorption and the amount of hydrogen generation.

Comparative Example 3

An oxygen absorber was obtained in the same manner as in Example 1 but without adding the calcium hydroxide and extending the heat-treating time from 8 hours to 10 hours. The conditions for blowing the air during the heat treatment were the same as those of Example 1. The oxygen absorber possessed a specific surface area of 1.3 m²/g, an average particle size of 26 μm, a half-peak width on a plane (110) of iron of 0.11°/2θ as measured by the X-ray diffraction, and the content of metal iron of 78%. Table 1 shows the amount of coarse particles contained in the obtained oxygen absorber and removed by the classification of two times in the step of production together with the measured results of the amount of oxygen absorption and the amount of hydrogen generation.

Comparative Example 4

An oxygen absorber was obtained in the same manner as in Example 1 but adding the calcium hydroxide in an amount of 0.5 parts by weight and effecting neither the heat treatment nor the classification after the heat treatment. The oxygen absorber possessed a specific surface area of 2.1 m²/g, an average particle size of 25 μm, a half-peak width on a plane (110) of iron of 0.29°/2θ as measured by the X-ray diffraction, and the content of metal iron of 87%. Table 1 shows the amount of coarse particles contained in the obtained oxygen absorber and removed by the classification together with the measured results of the amount of oxygen absorption and the amount of hydrogen generation.

Comparative Example 5

An oxygen absorber was obtained in the same manner as in Comparative Example 4 but adding the calcium hydroxide in an amount of 1 part by weight. The oxygen absorber possessed a specific surface area of 2.0 m²/g, an average particle size of 20 μm, a half-peak width on a plane (110) of iron of 0.30 °/2θ as measured by the X-ray diffraction, and the content of metal iron of 87%. Table 1 shows the amount of coarse particles contained in the obtained oxygen absorber and removed by the classification together with the measured results of the amount of oxygen absorption and the amount of hydrogen generation.

Comparative Example 6

An oxygen absorber was obtained in the same manner as in Comparative Example 4 but adding the calcium hydroxide in an amount of 2 parts by weight. The oxygen absorber possessed a specific surface area of 1.9 m²/g, an average particle size of 20 μm, a half-peak width on a plane (110) of iron of 0.30°/2 θ as measured by the X-ray diffraction, and the content of metal iron of 86%. Table 1 shows the amount of coarse particles contained in the obtained oxygen absorber and removed by the classification together with the measured results of the amount of oxygen absorption and the amount of hydrogen generation.

Example 3

30 Parts by weight of the oxygen absorber obtained in Example 1 and 70 parts by weight of a polypropylene (PP) having a melt index (MI) of 0.6 (g/10 min, 230° C.) were melt-kneaded by using a biaxial extruder (TEM-35B manufactured by Toshiba Kikai Co.) to prepare oxygen absorber-blended pellets. A 4-kind-6-layer sheet (a total thickness of 0.5 mm, thickness ratio of PP/ADH/EVOH/ADH/PO/PP=30/1/5/1/10/10) using the oxygen absorber-blended pellets (PO) as a first intermediate layer, ethylene/vinyl alcohol copolymer (EVOH: ethylene content of 32 mol %, saponification degree of 99.6 mol %) as a second intermediate layer, white PP obtained by blending PP with 8% by weight of a titanium white pigment as inner and outer layers, and maleic anhydride-modified PP (ADH) having an MI of 1.0 (g/10 min, 230° C.) as an adhesive layer, was produced by using a forming machine comprising a monoaxial extruder, a feed block, a T-die, a cooling roll and a sheet-drawing device. Table 2 shows the measured results of the amount of oxygen absorption and the amount of hydrogen generation of the obtained oxygen-absorbing sheet.

Comparative Example 7

An oxygen-absorbing sheet was obtained in the same manner as in Example 3 but using the oxygen absorber obtained in Comparative Example 1 instead of using the oxygen absorber obtained in Example 1. Table 2 shows the measured results of the amount of oxygen absorption and the amount of hydrogen generation of the obtained oxygen-absorbing sheet.

TABLE 1

| Sample No. | Recipe | X-ray half-value width °/2θ | Specific surface area m²/g | Ave. ptcl size μm | Amount of $O_2$ absorption After 1 hr ml/g | Comparative | Amount of $H_2$ generation After 15 days ml/g | Comparative | Amount of coarse ptcls |
|---|---|---|---|---|---|---|---|---|---|
| Ex. 1 | Alkaline 1 pt with heat treat | 0.12 | 1.8 | 23 | 97 | 85% | 0.02 | 0.1% | 15% |
| Ex. 2 | Alkaline 2 pts with heat treat | 0.13 | 1.0 | 23 | 94 | 82% | 0.02 | 0.1% | 15% |
| Comp. Ex. 1 | No alkaline without heat treat | 0.29 | 2.4 | 23 | 114 | 100% | 22.84 | 100.0% | 10% |
| Comp. Ex. 2 | No alkaline with heat treat | 0.12 | 1.8 | 24 | 127 | 111% | 3.70 | 16.2% | 32% |
| Comp. Ex. 3 | No alkaline with extended heat treat | 0.11 | 1.3 | 26 | 91 | 80% | 1.03 | 4.5% | 40% |
| Comp. Ex. 4 | Alkaline 0.5 pts without heat treat | 0.29 | 2.1 | 25 | 105 | 92% | 6.36 | 27.9% | 10% |
| Comp. Ex. 5 | Alkaline 1 pt without heat treat | 0.30 | 2.0 | 20 | 98 | 86% | 0.28 | 1.2% | 10% |
| Comp. Ex. 6 | Alkaline 2 pts without heat treat | 0.30 | 1.9 | 20 | 87 | 76% | 0.06 | 0.3% | 10% |

| Sample No. | Recipe | Evaluation $O_2$ absorption | $H_2$ suppress | Coarse ptcl suppress | Overall evaluation |
|---|---|---|---|---|---|
| Ex. 1 | Alkaline 1 pt with heat treat | ○ | ○ | ○ | ○ |
| Ex. 2 | Alkaline 2 pt with heat treat | ○ | ○ | ○ | ○ |
| Comp. Ex. 1 | No alkaline without heat treat | ○ | x | ○ | x |
| Comp. Ex. 2 | No alkaline with heat treat | ○ | x | x | x |
| Comp. Ex. 3 | No alkaline with extended heat treat | ○ | x | x | x |
| Comp. Ex. 4 | Alkaline 0.5 pts without heat treat | ○ | x | ○ | x |
| Comp. Ex. 5 | Alkaline 1 pts without heat treat | ○ | x | ○ | x |
| Comp. Ex. 6 | Alkaline 2 pts without heat treat | x | ○ | ○ | x |

TABLE 2

| Sample No. | $O_2$ absorber | Amount of $O_2$ absorption (ml/m²) After 30 days | Amount of $H_2$ generation, (ml/m²) After 30 days |
|---|---|---|---|
| Ex. 3 | Ex. 1 | 3040 | 0.6 |
| Comp. Ex. 7 | Comp. Ex. 1 | 2870 | 100 |

The invention claimed is:

1. An oxygen absorber for blending in a resin, comprising a mixed powder obtained by mixing and pulverizing an iron powder, a metal halide and an alkaline substance, followed by heat treatment in the presence of oxygen, said mixed powder having a half-peak width on a plane (110) of iron of 0.20°/2θ (Co—Kα) or less as measured by a powder X-ray diffraction method, a specific surface area of 0.5 m²/g or more, and an average particle size of 1 to 40 μm, the surfaces of said iron powder being coated with an iron oxide, and the content of metal iron in the iron powder being 60 to 80% by weight.

2. The oxygen absorber for blending in a resin according to claim 1, wherein said alkaline substance is a calcium hydroxide or a calcium oxide.

3. The oxygen absorber for blending in a resin according to claim 1, wherein said alkaline substance is blended in an amount of 0.5 to 2 parts by weight per 100 parts by weight of the iron powder.

4. An oxygen-absorbing resin composition containing the oxygen absorber for blending in a resin of claim 1.

5. An oxygen-absorbing container containing the above oxygen-absorbing resin composition of claim 4.

* * * * *